March 24, 1953 G. D. WILLITS 2,632,876
DUAL VOLTAGE REVERSIBLE MOTOR CIRCUIT
UTILIZING A THREE-STUD TERMINAL BOARD
Filed Feb. 3, 1951
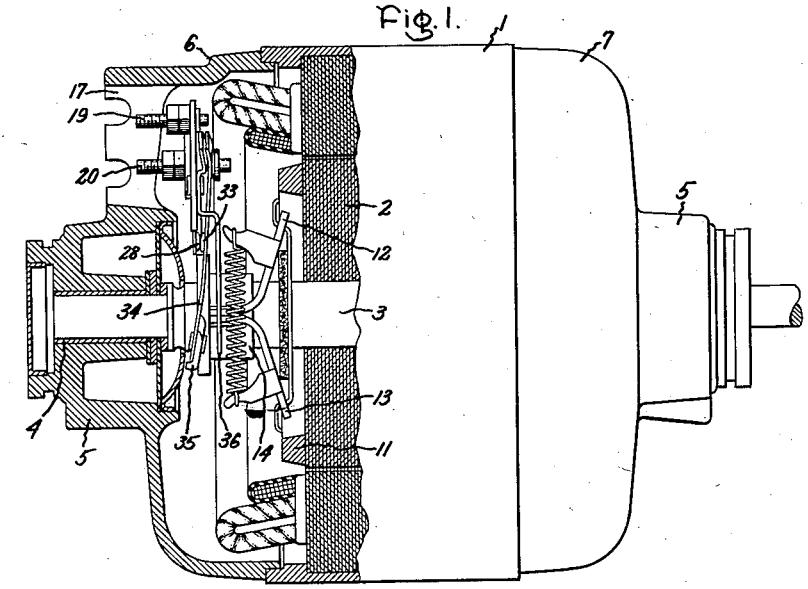
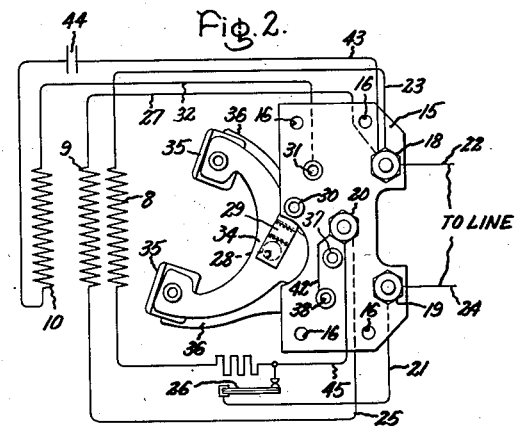
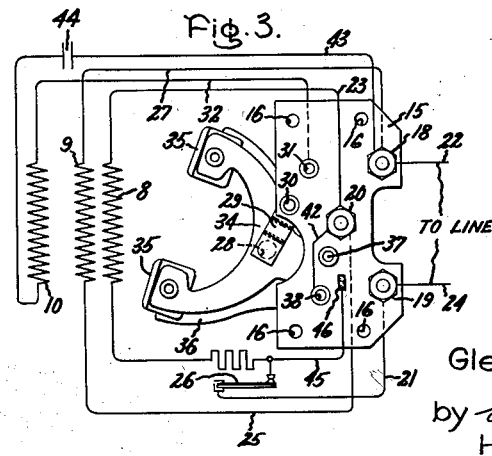
Inventor:
Glenn D. Willits,
by Ernest H. Britton
His Attorney.

Patented Mar. 24, 1953

2,632,876

UNITED STATES PATENT OFFICE 2,632,876

DUAL VOLTAGE REVERSIBLE MOTOR CIRCUIT UTILIZING A THREE-STUD TERMINAL BOARD

Glenn D. Willits, Leo, Ind., assignor to General Electric Company, a corporation of New York Application February 3, 1951, Serial No. 209,307

1 Claim. (Cl. 318—225)

My invention relates to motor circuits for electric motors utilizing a three-stud terminal board for making circuit connections whereby the motor can be operated as a reversible, dual voltage machine having overload protection. More specifically this invention contemplates a motor circuit utilizing a three-stud terminal board accessible from the exterior of the machine for making external connections and altering the internal circuit arrangement.

An object of my invention is to provide an electric motor circuit utilizing a three-stud terminal board whereby the circuit is readily adapted for use in a dual voltage, reversible motor with overload protection.

Another object of my invention is to provide means for altering the internal circuit arrangement of an electric motor by the use of a three-stud terminal board so that it is adaptable for use as a dual voltage reversible motor having overload protection.

Further objects and advantages of my invention will become apparent and my invention will be better understood from the following description referring to the accompanying drawing, and the features of novelty which characterize my invention will be pointed out with particularity in the claim annexed to and forming part of this specification.

A feature of this invention is an electric motor circuit utilizing a terminal board having three studs for connecting the motor windings to the supply line and for changing the internal connections of the motor circuits so that the motor can be operated from two voltages, is reversible, and has overload protection for all connection arrangements.

In the drawing, Fig. 1 is a side elevational view, partly in section, of a dynamoelectric machine provided with an embodiment of my invention; Fig. 2 is the schematic diagram of the motor field winding circuits as connected to the terminal board of the motor shown in Fig. 1 and adapted for use on a low voltage. Fig. 3 is a schematic diagram of the motor field winding circuits as connected to the terminal board of the motor shown in Fig. 1 and adapted for use on a higher voltage.

Referring to the drawing, I have shown a dynamoelectric machine having a stationary member 1 and a rotatable member 2 mounted on a shaft 3 which is journaled in bearings 4 supported in hubs 5 formed on end shields 6 and 7 of the stationary member of the machine. In this instance, a dynamoelectric machine is shown as a single phase induction motor, and excitation is adapted to be provided thereto by a single phase running field exciting winding which is wound as two main field exciting windings 8 and 9 and a starting field exciting winding 10. The rotatable member is shown as provided with a cast squirrel cage winding 11 of any suitable type.

In accordance with this invention, there is provided an improved terminal board assembly which includes a support member 15 of suitable insulating material, such as fiber board, which may be secured in the end shield 6 by any suitable means, as for example by a plurality of bolts through holes 16. One side of the support member 15 is exposed to the exterior of the machine through an opening 17 in the end shield 6. The other side of terminal board 15 is exposed to the interior of the machine. Terminal studs 18, 19 and 20 are secured to support member 15 and have exterior portions extending into the opening 17 and interior portions extending into the interior of the machine. By positioning the support member 15 in opening 17, ready access is provided to the terminal studs for making external connections and for altering the internal circuits of the machine as will be hereinafter described. In making this type terminal board, certain specifications of the fire underwriters must be borne in mind. This is especially true because the present practice of making motors having small external dimensions for a given output results in there being very little space available for a terminal board. Therefore, the connections to the motor windings are made in the illustrated arrangement through the three substantially equally spaced terminal studs 18, 19 and 20. The terminal stud 18 is adapted to be connected to one side of the line or source of electrical voltage through a lead 22 on its exterior portion and to a terminal of the motor main field exciting winding 9 through a lead 27 on its interior portion. The terminal stud 19 is adapted to be similarly connected to the other side of the line or source of electrical voltage through a suitable lead 24 on its external portion and to a terminal of a thermal overload switch 26 which is in series with the other of the motor main field exciting windings 8 through a suitable lead 21 on its interior portion. The third of the terminal studs 20 is adapted to have its interior portion connected to the other terminal of the motor main field exciting winding 9 through a suitable lead 25.

The circuit of the starting winding is adapted to be controlled by a pair of relatively moveable contacts which includes a substantially stationary contact 28 mounted on a supporting member 29 secured by suitable hollow rivets 30 and 31 to the support 15. Switch contact 28 is adapted to be electrically connected to one terminal of the motor starting winding through a suitable conductor or lead 32 which extends from the rivet 31 to a terminal of the starting field exciting winding 10. The other of the relatively moveable contacts includes a contact element 33 which is supported on a flexible mounting member 34 of electrical conductive material which is provided with a pair of pads 35 adapted to be engaged by the collar 14 of the centrifugal mechanism for moving the relatively moveable contact 33 toward the relatively stationary contact 28 to complete an electrical circuit therebetween by biasing these two contacts into engagement. The moveable contact 33 is adapted to be secured through the mounting member 34 to the support 15 by suitable rivets 37 and 38 and is adapted to be connected to terminal stud 20 through a suitable lead or jumper 42 which is electrically connected to a rivet 38 as shown in Fig. 2. The terminal stud 18 is adapted to be connected to the other terminal of the starting field exciting winding circuit through a suitable lead or conductor 43 which is shown in Fig. 2 as being connected to the terminal of a condenser 44 which is in series with the starting field exciting winding 10. In order to complete the circuit for the field exciting winding 9 of the motor, a jumper 45 is arranged to connect the external portion of the terminal stud 20 to the interior portion of the terminal stud 19 through thermal overload switch 26, as shown in Fig. 2. Terminal 18 is adapted to be connected to main field exciting winding 8 through lead or conductor 23, thus placing the two main field exciting windings 8 and 9 in parallel circuit relation across the source of voltage and the starting field exciting winding circuit across the field exciting winding 9 and, therefore, also across the relatively low line voltage.

For connection of the motor to a high voltage source which is substantially twice the low voltage source, jumper member 45 is adapted to be disconnected from the terminal stud 20 and taped as at 46. Conductor 23 is adapted to be disconnected from terminal 18 and connected to terminal 20 for providing a series connection of the main field exciting windings across the source of voltage. With this arrangement, the starting field exciting winding circuit again is connected across only one of the main field exciting windings 9 and, therefore, is subjected to substantially one-half the relatively high voltage, as is also each of the main field exciting windings 8 and 9.

It can now be readily seen that not only are the line connections to the motor made through openings 17 on the exterior portions of the terminal studs, but also the internal circuit arrangement of the field windings for low or high voltage operation is determined by the jumper 45 and the connection of conductor 23 of main field exciting winding 8 which is also connected on the exterior portions of the terminal studs. It is also apparent that this invention provides means for adapting the motor for operation on two voltages by the use of a terminal board having only three terminal studs. Further, the bimetal thermal overload device 26 will be effective to protect the start winding 10 as well as the main windings 8 and 9 of the motor against overheating whether the motor is connected to a high voltage or a low voltage. Excessive currents through the start winding are sufficiently high to cause the overload to open without the use of a separate heater element in series with the start winding. Thus, all external connections and alterations of the circuit can be conveniently made on the improved terminal board which is readily accessible from the exterior of the machine.

If desired, the start field exciting winding leads 42 and 43 may be interchanged in their connections to terminal studs 18 and 20, respectively, thereby reversing the direction of excitation provided by the start field exciting winding 10 and reversing the direction of rotation of the motor.

While I have illustrated and described a particular embodiment of my invention, modifications will occur thereof to those skilled in the art. I desire it to be understood, therefore, that my invention is not limited to the particular arrangement disclosed, and I intend in the appended claim to cover all modifications which do not depart from the spirit and scope of my invention.

What I claim as new and desire to secure by Letters Patent of the United States is:

A dual voltage motor comprising a thermal overload device having a bimetallic element, a stationary contact and a cooperating movable contact mounted on said bimetallic element, and a heater arranged to affect said bimetallic element; a start winding circuit, a main winding comprising two similar sections, a three stud terminal board for connecting said windings to an external source and for changing the internal winding connections of said motor, said start winding circuit and one of said main winding sections being connected between studs one and two to form a parallel circuit, one end of the other of said main winding sections being connected to one end of said heater, the other end of said heater being connected to stud three with said contacts and said bimetallic element being connected in series therewith, the other end of said other main winding section being selectively connected to either stud one or stud two, and a jumper connecting stud two and a point intermediate said other end of said heater and said contacts and bimetallic element when said other main winding section is connected to stud one, said jumper being disconnected from stud two when said other main winding section is connected to stud two, studs two and three being adapted to be connected to said external source.

GLENN D. WILLITS.

REFERENCES CITED

The following references are of record in the file of this patent:

UNITED STATES PATENTS

| Number | Name | Date |
| --- | --- | --- |
| 2,057,524 | Horning | Oct. 13, 1936 |
| 2,442,227 | Willits | May 25, 1948 |